(12) United States Patent
Schnellenberger

(10) Patent No.: US 6,876,400 B2
(45) Date of Patent: Apr. 5, 2005

(54) APPARATUS AND METHOD FOR PROTECTING A MEMORY SHARING SIGNAL CONTROL LINES WITH OTHER CIRCUITRY

(75) Inventor: John Ryan Schnellenberger, Westfield, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 499 days.

(21) Appl. No.: 10/025,160

(22) Filed: Dec. 19, 2001

(65) Prior Publication Data

US 2003/0112376 A1 Jun. 19, 2003

(51) Int. Cl.[7] ............................. H04N 5/44; H04N 9/64
(52) U.S. Cl. ...................... 348/725; 348/730; 348/714
(58) Field of Search ............................... 348/725, 714, 348/718, 719, 730, 836, 552; 345/530–574, 214, 211, 212; 455/3.06; 713/320, 323, 324, 340; 711/103, 115; 710/110, 14, 60; H04N 5/44, 9/64, 5/63

(56) References Cited

U.S. PATENT DOCUMENTS 5,563,655 A * 10/1996 Lathrop ...................... 348/714
5,748,255 A * 5/1998 Johnson et al. ............. 348/725
6,151,077 A * 11/2000 Vogel et al. ................. 348/725
6,693,678 B1 * 2/2004 Tults et al. .................. 348/571

* cited by examiner

*Primary Examiner*—Sherrie Hsia
(74) *Attorney, Agent, or Firm*—Joseph S. Tripoli; Robert D. Shedd; Reitseng Lin

(57) ABSTRACT

An apparatus such as a television signal receiver includes first and second circuit boards. The first circuit board includes a memory, and control circuitry for controlling at least one function of the apparatus. The second circuit board is operably coupled to the first circuit board via control lines. The second circuit board includes a controller for generating first and second control signals. The control lines transmit the first control signals from the controller to the memory when the apparatus is in a first operational state, and transmit the second control signals from the controller to the control circuitry when the apparatus is in a second operational state. To prevent inadvertent writes to the memory during the second operational state, the controller places the memory in an unpowered state when the controller transmits the second control signals to the control circuitry. Also, means are provided to prevent the memory from keeping the control lines in one state, for example, low level, during the unpowered state to allow communications to continue on the control lines.

18 Claims, 2 Drawing Sheets

APPARATUS AND METHOD FOR PROTECTING A MEMORY SHARING SIGNAL CONTROL LINES WITH OTHER CIRCUITRY

BACKGROUND OF THE INVENTION (1) Field of the Invention

The present invention generally relates to electrical devices such as television signal receivers, and more particularly, to a technique for protecting a memory included in such a device from being inadvertently written to when, for example, signal control lines connected to the memory are shared between different devices.

(2) Description of the Related Art

Electrical devices such as television signal receivers often include one or more circuit boards. Each circuit board typically has attached thereto electrical components, such as integrated circuits ("ICs") and other elements, which enable various device operations to be performed. Prior designs for television signal receivers often employed only a single circuit board. With these prior designs, a primary incentive was to maximize the use of board area. However, since only one circuit board was used, no issues regarding connections between different circuit boards existed.

Current designs for television signal receivers, on the other hand, may use multiple circuit boards. The use of multiple circuit boards, as compared to a single board, is particularly attractive since it enables the circuit design to be modularized. In particular, different board sections can be re-designed without having to reorganize the layout of all receiver circuits, as is often the case when using only a single circuit board. Moreover, the use of multiple circuit boards allows a single-sided board to be used for one group of circuits, and a multi-layer board for other circuits.

Despite its advantages, the use of multiple circuit boards does create disadvantages regarding connections between different boards. In particular, it is desirable to minimize the number of connectors (e.g., pins) used to provide a connection between circuit boards. Minimizing the number of such connectors is especially desirable since the cost of each connector is quantifiable in a monetary sense. This is particularly significant in certain industries, such as the consumer electronics industry, where product cost is a driving force among competitors. Accordingly, there is a need for a technique which reduces the number of connections required between circuit boards in an apparatus, such as a television signal receiver.

One such technique for reducing the number of connections between circuit boards involves sharing signal control lines connected between two circuit boards of an apparatus, such as a television signal receiver. According to this technique, a microcontroller on one circuit board uses the signal control lines to read a memory on another circuit board when the apparatus is placed in the OFF state, and uses the same signal control lines to control another operation of the apparatus (e.g., a deflection operation) when the apparatus is placed in the ON state.

In practicing the aforementioned technique, a problem has been identified in that the memory may be inadvertently written to when the microcontroller uses the signal control lines to control an apparatus operation while the apparatus is placed in the ON state. Accordingly, there is a need for a technique that enables the signal control lines to be shared, but prevents the memory connected to the lines from being inadvertently written to by the microcontroller, or other devices connected to the control lines. The present invention addresses these and other issues.

BRIEF SUMMARY OF THE INVENTION

In accordance with the present invention, an apparatus includes first and second circuit boards. The first circuit board includes a memory, and control circuitry for controlling at least one function of the apparatus. The second circuit board is operably coupled to the first circuit board via control lines. The second circuit board includes a controller for generating first and second control signals. The control lines transmit the first control signals from the controller to the memory when the apparatus is in a first operational state, and transmit the second control signals from the controller to the control circuitry when the apparatus is in a second operational state. To prevent inadvertent writes to the memory during the second operation state, the memory is placed in an unpowered state during the second operational state when the controller transmits the second control signals to the control circuitry. Additionally, the memory is coupled to means for preventing the memory from keeping the control lines in a low state during the unpowered state.

In an exemplary embodiment, the apparatus comprises a television signal receiver having a first circuit board has attached thereto a memory device and circuitry for controlling deflection, a second circuit board has attached thereto a microcontroller, the first and second circuit boards being coupled to each other via control lines. In the first operational state the microcontroller generates first control signals via the control lines to retrieve operational data from the memory, and in the second operational state the microcontroller uses the retrieved operational data to control the circuitry for controlling deflection. During the second operational state the microcontroller places the memory in an unpowered state. The memory device may include means for preventing the memory device from loading the control lines, thereby allowing the other devices connected to the control line to continue communicating. In one embodiment, the memory includes a zener diode coupled to the Vcc input to prevent the memory, in the unpowered state, from keeping the control lines in the low state. This ensures that the microcontroller can continue to communicate with the control circuitry via the control lines. A method performed by the foregoing apparatus is also disclosed herein.

BRIEF DESCRIPTION OF THE SEVERAL VIEWS OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE INVENTION

Figure 1:
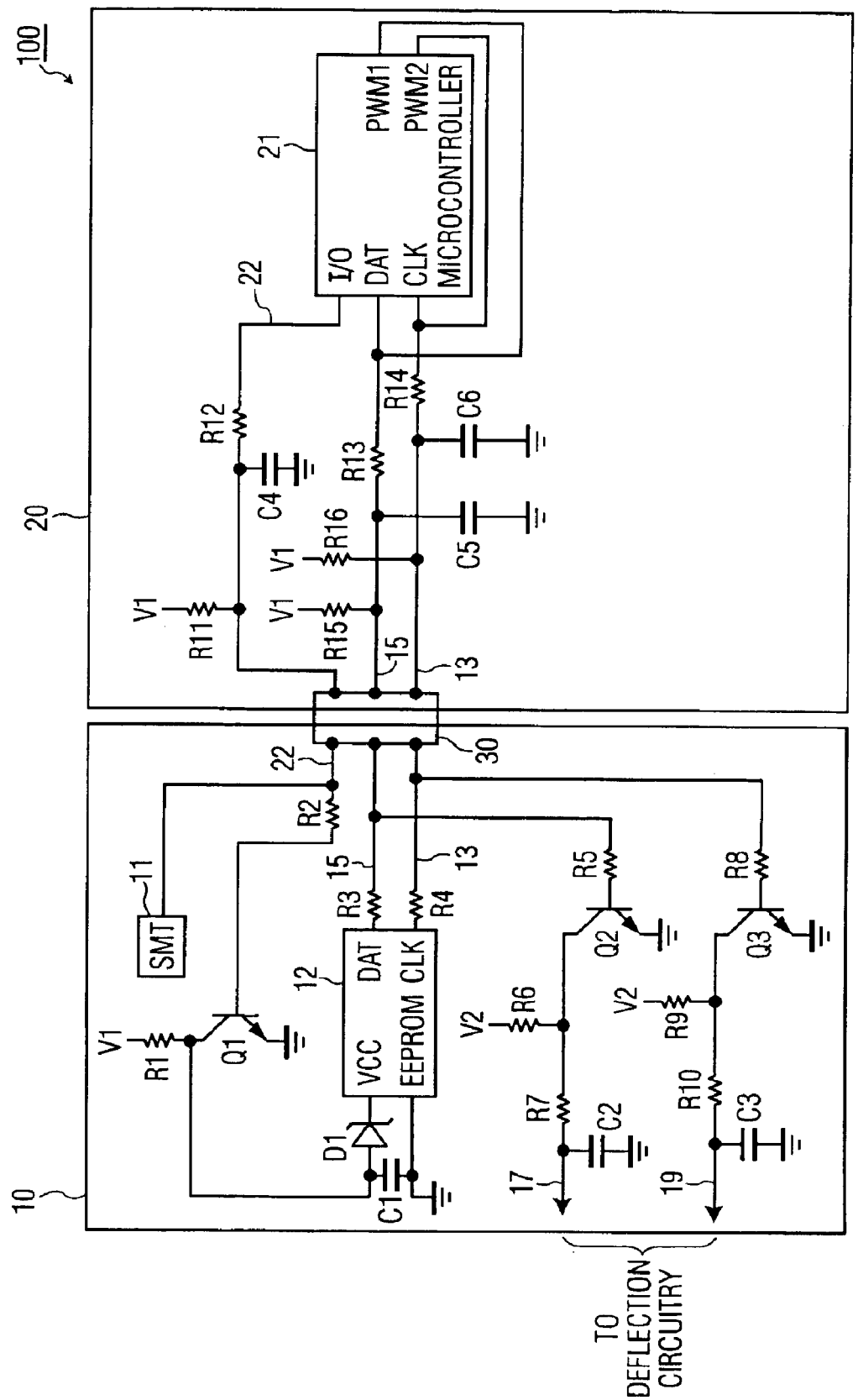
FIG. 1 is a diagram of a relevant portion of an apparatus suitable for implementing the present invention.

Referring now to the drawings, and more particularly to FIG. 1, a diagram of a relevant portion of an apparatus 100 suitable for implementing the present invention is shown. For purposes of example and explanation, apparatus 100 of FIG. 1 is represented as a television signal receiver. However, it is noted that the principles of the present invention may be applicable to other types of electronic devices, particularly those that utilize multiple circuit boards connected together.

Receiver 100 of FIG. 1 comprises a first circuit board 10, a second circuit board 20, and a board connector 30. According to an exemplary embodiment, first circuit board 10 enables operations related to power supply and deflection functions of receiver 100, and second circuit board 20 enables operations related to signal processing functions of receiver 100. First board 10 is electrically connected to second circuit board 20 via board connector 30.

First circuit board 10 includes a switch mode transformer ("SMT") 11, which enables receiver 100 to be placed in the ON or OFF state in response to, for example, a user input. An electrically erasable, programmable read-only memory ("EEPROM") 12 operates as a non-volatile memory for storing data, such as voltage data used to control deflection operations of receiver 100. EEPROM 12 includes a voltage input ("Vcc") terminal, a clock ("CLK") terminal, and a data ("DAT") terminal. The Vcc terminal is electrically coupled to receive a signal that turns EEPROM 12 ON and OFF. The CLK terminal is electrically coupled to a serial clock line ("SCL") 13, and the DAT terminal is electrically coupled to a serial data line ("SDA") 15. According to an exemplary embodiment, SCL 13 and SDA 15 collectively represent an inter-integrated circuit ("IIC"—typically pronounced "I-squared C") bus, and may be referred to herein as bus lines or control lines.

In general, an IIC bus is a two-transmission medium, bi-directional digital bus that permits two ICs to communicate on a bus path at a time. An IC serving in a "master" mode of operation, initiates a data transfer operation on the bus and generates clock signals that permit the data transfer. An IC serving in a "slave" mode of operation is the IC being operated on or communicated to by the master IC, whereby the slave IC is instructed to either send or receive data. Each IC has its own unique address, wherein the master IC initiates and terminates the communications. Further details regarding the IIC bus represented by SCL 13 and SDA 15 will be provided later herein.

First circuit board 10 also includes ten resistors R1 to R10, three capacitors C1 to C3, and three transistors Q1 to Q3. Resistor R1 operates as a pull-up resistor for a collector junction of transistor Q1, and is electrically coupled to a voltage source V1, which according to an exemplary embodiment is 3.3 volts. In this manner, resistor R1 and transistor Q1 operate as a signal inverter. Resistor R1 has a preferred value of 100 ohms. Resistor R2 is electrically coupled between a terminal of board connector 30 and a base junction of transistor Q1. Resistor R2 has a preferred value of 1 K ohms. The collector junction of transistor Q1 is electrically coupled to the Vcc terminal of EEPROM 12, and provides the signal that turns EEPROM 12 ON and OFF. Transistor Q1 is preferably embodied as an NPN-type bipolar junction transistor ("BJT"). Capacitor C1 is a bypass capacitor for EEPROM 12, and has a preferred value of 100 nanofarads.

Resistors R3 and R4 are provided to create resistance on SDA 15 and SCL 13, respectively. According to an exemplary embodiment, resistors R3 and R4 each provide 1 K ohms of resistance. As indicated in FIG. 1, SCL 13 and SDA 15 are tapped in first circuit board 10 to provide two separate control channels. In particular, SDA 15 is tapped to provide a first control channel which generates an output signal represented at reference numeral 17, and SCL 13 is tapped to provide a second control channel, which generates an output signal represented at reference numeral 19. Output signals 17 and 19 control deflection operations of receiver 100. The circuitry making up the first and second control channels may collectively be referred to herein as control circuitry.

The first control channel includes resistors R5 to R7, capacitor C2, and transistor Q2. Resistor R5 provides a resistance between SDA 15 and the base junction of transistor Q2, and has a preferred value of 10 K ohms. Transistor Q2 is preferably embodied as an NPN-type BJT. The collector junction of transistor Q2 provides an output path for the first control channel. Resistor R6 operates as a pull-up resistor and is electrically coupled to a voltage source V2, which according to an exemplary embodiment is 5.1 volts. The preferred value for resistor R6 is 1 K ohms. Resistor R7 and capacitor C2 establish a time constant, and preferably have values of 1 K ohms and 820 nanofarads, respectively. According to an exemplary embodiment, output signal 17 is used to establish the voltage of a flyback transformer (not shown), which is used in the deflection operations of receiver 100.

The second control channel includes resistors R8 to R10, capacitor C3, and transistor Q3. Resistor R8 provides a resistance between SCL 13 and the base junction of transistor Q3, and has a preferred value of 10K ohms. Transistor Q3 is preferably embodied as an NPN-type BJT. The collector junction of transistor Q3 provides an output path for the second control channel. Resistor R9 operates as a pull-up resistor and is electrically coupled to voltage source V2, which as previously indicated is 5.1 volts. The preferred value for resistor R9 is 1 K ohms. Resistor R10 and capacitor C3 establish a time constant, and preferably have values of 1 K ohms and 820 nanofarads, respectively. According to an exemplary embodiment, output signal 19 is used to control the voltage of the flyback transformer (not shown).

Second circuit board 20 includes a microcontroller 21, which controls various operations of receiver 100. Microcontroller 21 includes an input/output ("I/O") terminal, a CLK terminal and a DAT terminal. The I/O terminal is electrically coupled to a signal line 22 and provides, among other things, an output signal that enables various components of receiver 100 to be powered up when receiver 100 is turned on. The CLK terminal is electrically coupled to SCL 13, and the DAT terminal is electrically coupled to SDA 15. Although not expressly shown in FIG. 1, microcontroller 21 is electrically coupled to a voltage source, such as voltage source V1. The terms "microcontroller" and "controller" may be used interchangeably herein.

Microcontroller 21 also includes first and second pulse width modulated ("PWM") terminals ("PWM1" and "PWM2"), which output first and second PWM signals, respectively. The PWM1 and PWM2 terminals are electrically coupled to SDA 15 and SCL 13, respectively, and thereby provide the first and second PWM signals to the first and second control channels of first circuit board 10, respectively. Accordingly, the first PWM signal is used to generate output signal 17, and the second PWM signal is used to generate output signal 19. While PWM signals are utilized in a preferred embodiment, signals of other formats may, of course, also be utilized.

Second circuit board 20 also includes six resistors R11 to R16, and three capacitors C4 to C6. Resistor R11 operates as a pull-up resistor for signal line 22 connected to the I/O terminal of microcontroller 21, and is electrically coupled to voltage source V1, which as previously indicated is 3.3 volts. Resistor R11 has a preferred value of 10 K ohms. Resistor R12 and capacitor C4 operate to filter out radio frequency interference from the signal line connected to the I/O terminal of microcontroller 21. Resistor R12 and capacitor C4 have preferred values of 1 K ohms and 1 nanofarad, respectively. Similarly, resistor R13 and capacitor C5 operate to filter out radio frequency interference from SDA 15, while resistor R14 and capacitor C6 operate to filter out radio frequency interference from SCL 13. According to an exemplary embodiment, resistors R13 and R14 each have values of 1 K ohms, and capacitors C5 and C6 each have values of 100 picofarads. Resistors R15 and R16 operate as pull-up resistors and are electrically coupled to voltage source V1, which as previously indicated is 3.3 volts. Resistors R15 and R16 each have preferred values of 10 K ohms.

In operation, the IIC bus (i.e., SCL 13 and SDA 15) is shared between two different operations of microcontroller 21. In particular, when receiver 100 is in a first operational state (i.e., receiver 100 is connected to a power source, but is in the OFF state), microcontroller 21 operates as a master IC and transmits first control signals to EEPROM 12 via SCL 13 and SDA 15 to thereby read data from EEPROM 12, which operates as a slave IC. Microcontroller 21 and EEPROM 12 receive electrical power from a standby power source, namely voltage source V1, during the first operational state. According to an exemplary embodiment, the data read from EEPROM 12 by microcontroller 21 comprises voltage data used to control deflection operations of receiver 100.

During the data reading operation, SCL 13 propagates clock signals from microcontroller 21 to EEPROM 12. SDA 15 is used to transfer data using serial digital transactions. Typically, one or more bits are used as acknowledgment bits. According to an exemplary design, when both SCL 13 and SDA 15 are held in a logic high state, no data can be transferred between microcontroller 21 and EEPROM 12. A transition from a logic high state to a logic low state on SDA 15, while SCL 13 is in a logic high state, indicates a start condition for the exchange of digital data over the IIC bus. Conversely, a transition from a logic low state to a logic high state on SDA 15, while SCL 13 is in a logic high state, indicates a stop condition. According to an exemplary embodiment, microcontroller 21 generates one clock pulse for each bit of digital data transferred on SDA 15, and a logic state on SDA 15 can only change when the clock signal on SCL 13 is in a logic low state. Of course, signal protocols other than the foregoing one may be used. When microcontroller 21 reads data from EEPROM 12, the PWM1 and PWM2 terminals of microcontroller 21 are in a high-impedance state, and resistors R5 and R8 prevent the control circuitry of the first and second control channels from loading SDA 15 and SCL 13. The input and output status of the pins of microcontroller 21, and thus the impedance, may be controlled as known, such as via the data direction registers.

When receiver 100 is in a second operational state (i.e., receiver 100 is connected to a power source and placed in the ON state), the DAT and CLK terminals of microcontroller 21 are in a high-impedance state, and the PWM1 and PWM2 terminals may be used to output the first and second PWM signals, respectively. The first and second PWM signals may be referred to herein as second control signals. The PWM1 terminal is electrically coupled to SDA 15 and thereby provides the first PWM signal to the first control channel of first circuit board 10 to enable generation of output signal 17. Similarly, the PWM2 terminal is electrically coupled to SCL 13 and thereby provides the second PWM signal to the second control channel of first circuit board 10 to enable generation of output signal 19. According to an exemplary embodiment, the first and second PWM signals are generated by microcontroller 21 in dependence upon the voltage data read from EEPROM 12 in the first operational state, i.e., when receiver 100 is in the OFF state. In the aforementioned manner, SCL 13 and SDA 15 are shared between two different devices during two different operations of microcontroller 21. Capacitor C1 may be included between the Vcc input terminal and the ground terminal to compensate for the peak currents during data read/write operations to EEPROM 12.

When the first and second PWM signals are transmitted to the control circuitry of first circuit board 10, as described above, a potential problem has been recognized in that EEPROM 12 can be inadvertently written to and thereby corrupt data stored within EEPROM 12. In particular, when the PWM signals are transmitted over the IIC bus, if a start condition is generated (i.e., a transition from a logic high state to a logic low state on SDA 15, while SCL 13 is in a logic high state), and address information generated by the phasing of the PWM signals corresponds to address information of EEPROM 12, then EEPROM 12 may be inadvertently written to by microcontroller 21.

To avoid this potential problem, the present invention causes electrical power to be removed from EEPROM 12 before the PWM signals are transmitted over the IIC bus. More specifically, when receiver 100 is placed in the ON state, and thereby enters the second operational state, microcontroller 21 outputs a power control signal from its I/O terminal to signal line 22. The power control signal is transferred to first circuit board 10 via board connector 30, and controls certain power functions of receiver 100. In particular, the power control signal, which according to an exemplary embodiment is a logic high signal, is provided to SMT 11 which turns ON a power supply (not shown) of receiver 100 used during the second operational state. Moreover, the power control signal is provided to the base junction of transistor Q1, which operates as an inverter, and thereby disconnects voltage source V1 from the Vcc terminal of EEPROM 12. Then, once EEPROM 12 is in an unpowered state, microcontroller 21 can transmit the PWM signals over the IIC bus without the risk of inadvertently writing to EEPROM 12.

In the exemplary embodiment, EEPROM 12 includes means for preventing EEPROM 12 from loading down control lines 13 and 15 when EEPROM 12 is in the unpowered state. Generally, ICs include electrostatic discharge ("ESD") protection diodes coupled to the pins. In the present embodiment, EEPROM 12 includes the above-mentioned preventing means, for example, a zener diode D1, coupled to, for example, the Vcc pin. Various devices and methods that are known for providing such functionality, for example, zener diodes, and bipolar transistors, may be used.

Figure 2:
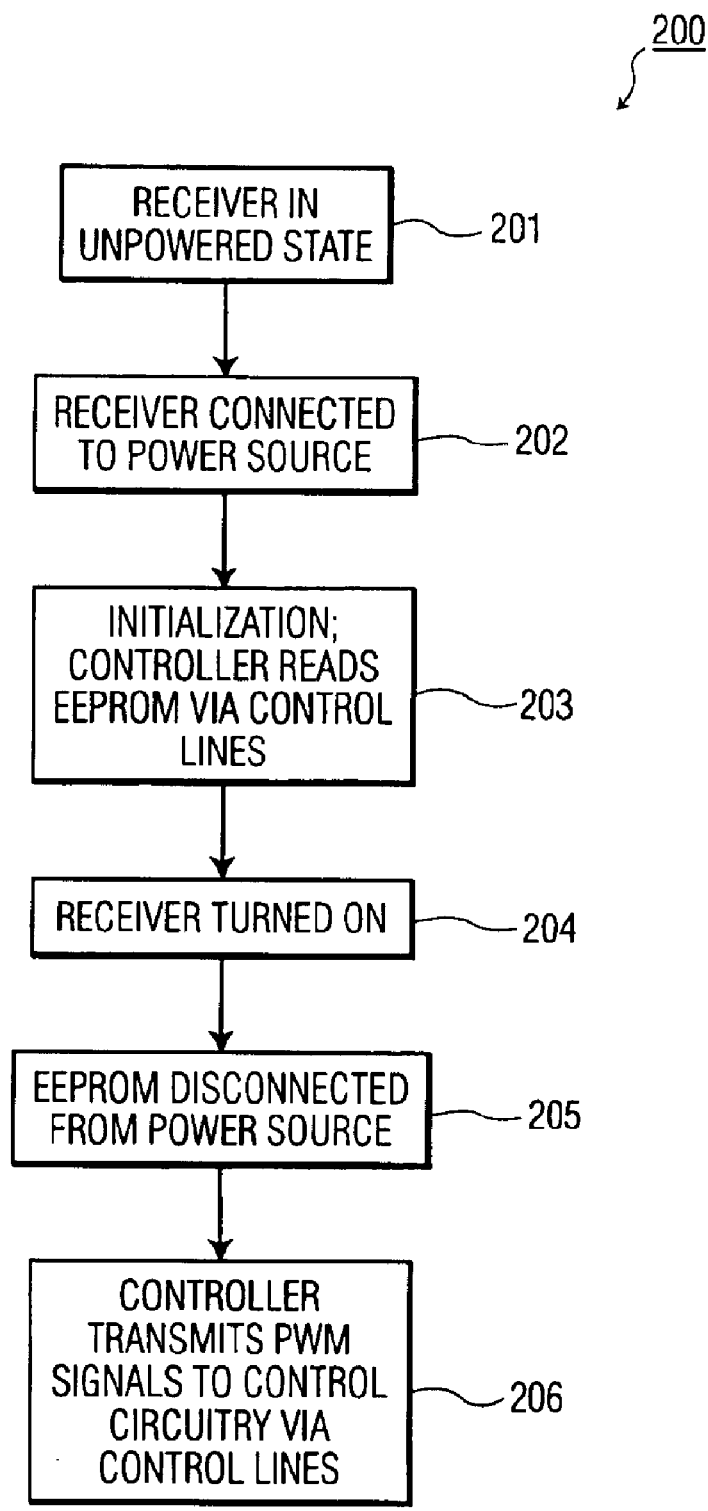
FIG. 2 is a flowchart illustrating exemplary steps for practicing the present invention.

Referring now to FIG. 2, a flowchart 200 illustrating exemplary steps for practicing the present invention is shown. For purposes of example and explanation, the steps of FIG. 2 will be described with reference to television signal receiver 100 of FIG. 1.

At step 201, receiver 100 is in an unpowered state. That is, receiver 100 is not connected to an electrical power source, such as a household plug outlet or the like. At step 202, receiver 100 is connected to an electrical power source (e.g., plugged in), but is not turned on. That is, receiver 100 enters the first operational state at step 202. As previously indicated herein, certain components of receiver 100, such as microcontroller 21 and EEPROM 12 receive electrical power from a standby power source, namely voltage source V1, during the first operational state.

In response to being connected to a power source at step 202, process flow advances to step 203, where receiver 100 performs an initialization process. In particular, as part of this initialization process, microcontroller 21 operates as a master IC and transmits the first control signals to EEPROM 12 via SCL 13 and SDA 15 to thereby read data from EEPROM 12, which operates as a slave IC. According to an exemplary embodiment, the data read from EEPROM 12 by microcontroller 21 comprises voltage data used to control deflection operations of receiver 100. Microcontroller 21 stores the read data in an internal memory (not shown), and retains it there as long as receiver 100 is plugged in, or otherwise powered.

Next, at step 204, receiver 100 is turned on, for example, in response to receiving a user input at an input terminal such as a hand-held remote control unit. As previously indicated herein, receiver 100 is in the second operational state when it is both connected to a power source, and turned on. Accordingly, step 204 causes receiver 100 to enter the second operational state. In response to step 204, microcontroller 21 outputs the power control signal from its I/O terminal to signal line 22. The power control signal causes, among other things, transistor Q1 of first circuit board 10 to disconnect voltage source V1 from the Vcc terminal of EEPROM 12, at step 205.

Then, once EEPROM 12 is in an unpowered state, process flow advances to step 206 where microcontroller 21 transmits the second control signals, namely the first and second PWM signals, to the control circuitry of first circuit board 10. That is, the PWM1 terminal outputs the first PWM signal to SDA 15, and thereby provides the first PWM signal to the first control channel of first circuit board 10 to enable generation of output signal 17. Similarly, the PWM2 terminal outputs the second PWM signal to SCL 13, and thereby provides the second PWM signal to the second control channel of first circuit board 10 to enable generation of output signal 19. As previously indicated, the first and second PWM signals may be generated by microcontroller 21 in dependence upon the voltage data read from EEPROM 12 at step 203. In the aforementioned manner, SCL 13 and SDA 15 are shared between two different operations of microcontroller 21, and the risk of inadvertently writing to EEPROM 12 is avoided.

Although the present invention has been described in relation to a television signal receiver, the invention is applicable to various systems, either with or without display devices, and the phrases "television signal receiver" or "receiver" as used herein are intended to encompass various types of apparatuses and systems including, but not limited to, television sets or monitors that include a display device, and systems or apparatuses such as a set-top box, video tape recorder (VTR), digital versatile disk (DVD) player, video game box, personal video recorder (PVR) or other apparatus that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A television signal receiver, comprising:
   a first circuit board including a memory and control circuitry for controlling an operation of the receiver, the control circuitry controlling the operation of the receiver in response to data stored in the memory; and
   a second circuit board operably coupled to the first circuit board via inter-integrated circuit bus lines, the second circuit board including a controller, coupled to the inter-integrated circuit bus lines, for generating first control signals in accordance with a first signal format in a first operational state and second control signals in accordance with a second signal format in a second operational state,
   the controller placing the memory into an unpowered state during the second operational state, the memory being coupled to means for preventing the memory from keeping the bus lines at a low state when the memory is in the unpowered state,
   wherein the memory and the control circuitry are coupled to the inter-integrated circuit bus lines, and the controller transmits the first control signals to the memory via the inter-integrated circuit bus lines without affecting the control circuitry in the first operational state, and transmits the second control signals to the control circuitry via the bus lines without affecting the memory in the second operational state.

2. The television signal receiver according to claim 1, further comprising means for preventing the memory from keeping the bus lines in the low state while the memory is in the unpowered state comprises a zener diode.

3. The television signal receiver according to claim 1, wherein the memory includes operational data for controlling deflection circuitry and the control circuitry controls the deflection circuitry in response to the operational data.

4. The television signal receiver according to claim 3, wherein the first operational state corresponds to an OFF state of the receiver, and the second operational state corresponds to an ON state of the receiver.

5. The television signal receiver according to claim 3, wherein the first control signal corresponds to IIC compliant signals and the second control signals are pulse width modulated signals.

6. The television signal receiver according to claim 3, wherein the control circuitry is coupled to the inter-integrated circuit bus lines via bipolar transistors.

7. A signal processing apparatus, comprising:
   a first circuit board including first electronic circuitry, and second electronic circuitry for controlling at least one operation of the receiver; and
   a second circuit board operably coupled to the first circuit board via control lines, the second circuit board including a controller, coupled to the control lines, for generating first control signals in accordance with a first signal format in a first operational state and second control signals in accordance with a second signal format in a second operational state,
   the first electronic circuitry being placed in an unpowered state during the second operational state, the first electronic circuitry being coupled to means for preventing the first electronic circuitry from keeping the control lines at a low state when the first electronic circuitry is in the unpowered state, and the first and second electronic circuitry are coupled to the control lines, and the controller transmits the first control signals to the first electronic circuitry via the control lines without affecting the second electronic circuitry in the first operational state, and transmits the second control signals to the second electronic circuitry via the control lines without affecting the first electronic circuitry in the second operational state.

8. The signal processing apparatus of claim 7, wherein the first electronic circuitry comprises a memory circuit having operational data stored therein for controlling the second electronic circuitry, the controller retrieving the operational data in the first operational state and controlling the second electronic circuitry in response to the operational data in the second operational state.

9. The signal processing apparatus of claim 8, wherein the operational data comprises voltage data for controlling deflection circuitry, and the second electronic circuitry controls the deflection circuitry in response to the voltage data.

10. The signal processing apparatus of claim 9, wherein the first operational state corresponds to the apparatus being in an OFF state and the controller and the first electronic circuitry is powered by a standby power supply, and the second operational state corresponds to the apparatus being in the ON state.

11. The signal processing apparatus of claim 7, wherein the first control signals comply with the IIC standard and the second control signals comprise pulse width modulated signals.

12. A method of operating a television signal receiver, the method comprising steps of:

providing first and second circuit boards coupled via control lines, the first circuit board having a memory device and control circuitry included thereon and coupled to the control lines, the second circuit board having a controller included thereon and coupled to the control lines;

transmitting via the control lines, first control signals in accordance with a first signal format from the controller on the second circuit board to the memory device on the first circuit board, without affecting the control circuitry, when the receiver is in a first operational state; and transmitting via the control lines, second control signals in accordance with a second signal format from the controller to the control circuitry on the first circuit board, without affecting the memory device, when the receiver is in a second operational state; and placing the memory device in an unpowered state during the step of transmitting the second control signals, the memory device being coupled to means for preventing the memory device from keeping the control lines In a low state when the memory device is placed in the unpowered state.

13. The method of claim 12, wherein the first operational state corresponds to the receiver being in the OFF state wherein the controller and the memory device is supplied by a standby power supply, and the second operational state corresponds to the receiver being in an ON state.

14. The method of claim 12, wherein the first control signals enable the controller to read data from the memory device.

15. The method of claim 12, further comprising the step of controlling deflection circuitry via the control circuitry in response to data read from the memory device.

16. The method of claim 12, wherein the first transmitting step comprises transmitting the first control signals in accordance with the IIC standard.

17. The method of claim 12, wherein the second transmitting step comprises transmitting the second control signals as pulse width modulated signals.

18. The method of claim 12, wherein the providing step comprises providing the first circuit board having the control circuitry coupled to the control lines via bipolar transistors.

* * * * *